US012365047B2

(12) United States Patent
Pourcho et al.

(10) Patent No.: US 12,365,047 B2
(45) Date of Patent: Jul. 22, 2025

(54) ALIGNING OF MELTING BEAM SOURCE IN ADDITIVE MANUFACTURING SYSTEM

(71) Applicant: General Electric Company, Schenectady, NY (US)

(72) Inventors: John Bryan Pourcho, Simpsonville, SC (US); Robert Joseph Rohrssen, Greenville, SC (US); Maxwell Evan Miller, Simpsonville, SC (US); James Joseph Murray, III, Mauldin, SC (US); Michael Ryan Horton, Greenville, SC (US); Evan John Dozier, Greenville, SC (US); Clay Thomas Griffis, Greenville, SC (US); Chad Joseph Dulkiewicz, Simpsonville, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 775 days.

(21) Appl. No.: 17/653,535

(22) Filed: Mar. 4, 2022

(65) Prior Publication Data
US 2023/0278134 A1    Sep. 7, 2023

(51) Int. Cl.
*B22F 12/40*  (2021.01)
*B22F 10/28*  (2021.01)
(Continued)

(52) U.S. Cl.
CPC .............. *B23K 26/04* (2013.01); *B22F 10/28* (2021.01); *B22F 10/85* (2021.01); *B22F 12/40* (2021.01);
(Continued)

(58) Field of Classification Search
CPC .. B22F 10/31; B22F 5/00; B22F 5/003; B22F 5/10; B22F 3/1103; B22F 2005/005;
(Continued)

(56) References Cited

U.S. PATENT DOCUMENTS 6,193,923 B1   2/2001  Leyden et al.
7,685,883 B2   3/2010  Low et al.
(Continued)

FOREIGN PATENT DOCUMENTS

CA    3056838 A1   10/2018
CN   114266109 A    4/2022
(Continued)

OTHER PUBLICATIONS

U.S. Appl. No. 17/022,259, Final Office Action dated Sep. 29, 2022, 20 pages.
(Continued)

*Primary Examiner* — Steven W Crabb
*Assistant Examiner* — Allison E Helferty
(74) *Attorney, Agent, or Firm* — James Pemrick; Charlotte Wilson; Hoffman Warnick LLC

(57) ABSTRACT

Embodiments of the disclosure relate to the aligning of a melting beam source in an additive manufacturing (AM) system. Methods of the disclosure may include forming a first test article and a second test article of different shapes on a build plate. The method further includes measuring a vertical scale, vertical alignment, horizontal scale, and an alignment of the melting beam source using the first and second test articles. The method includes determining whether one of the vertical scale, the vertical alignment, the horizontal scale, or the horizontal alignment of the melting beam source is not within a corresponding tolerance of a target specification. If at least one of the vertical scale, the vertical alignment, the horizontal scale, or the horizontal alignment is within the corresponding tolerance, the method includes adjusting the melting beam source of the AM system to align the melting beam source to yield the target specification.

20 Claims, 7 Drawing Sheets

(51) Int. Cl.
  *B22F 10/85* (2021.01)
  *B23K 26/03* (2006.01)
  *B23K 26/04* (2014.01)
  *B23K 26/342* (2014.01)
  *B33Y 10/00* (2015.01)
  *B33Y 30/00* (2015.01)
  *B33Y 50/02* (2015.01)
  *G05B 15/02* (2006.01)

(52) U.S. Cl.
  CPC ............ *B23K 26/03* (2013.01); *B23K 26/342* (2015.10); *B33Y 10/00* (2014.12); *B33Y 30/00* (2014.12); *B33Y 50/02* (2014.12); *G05B 15/02* (2013.01)

(58) Field of Classification Search
  CPC ........ B22F 10/38; B22F 10/385; B22F 10/39; B23K 26/03; B23K 26/04; B23K 26/342; B29C 64/141; B29C 64/153; B29C 64/245; B29C 64/268; B29C 64/393; B29C 64/40; G05B 19/4099; B33Y 80/00
  See application file for complete search history.

(56) References Cited

U.S. PATENT DOCUMENTS

| | | |
|---|---|---|
| 10,473,552 B1 | 11/2019 | Leathe et al. |
| 10,656,623 B2* | 5/2020 | Capobianco, Jr. ........................... G05B 19/4099 |
| 2009/0138231 A1 | 5/2009 | Little et al. |
| 2010/0174392 A1 | 7/2010 | Fink et al. |
| 2011/0029114 A1 | 2/2011 | Rose et al. |
| 2014/0300017 A1 | 10/2014 | Wighton et al. |
| 2015/0360421 A1* | 12/2015 | Burhop .............. G05B 19/4097 700/98 |
| 2018/0036972 A1* | 2/2018 | Talgorm ................ B29C 64/118 |
| 2018/0104742 A1 | 4/2018 | Kottilingam et al. |
| 2018/0345409 A1 | 12/2018 | Pavlov et al. |
| 2019/0201979 A1* | 7/2019 | Huang .................... B22F 12/90 |
| 2020/0004225 A1* | 1/2020 | Buller ....................... B22F 5/04 |
| 2020/0086557 A1* | 3/2020 | Klaußner .............. B29C 64/153 |
| 2020/0111269 A1 | 4/2020 | Danis et al. |
| 2020/0181385 A1 | 6/2020 | Roberson et al. |
| 2020/0269352 A1 | 8/2020 | Maurer et al. |
| 2020/0298499 A1* | 9/2020 | Gupta .................... B33Y 50/00 |
| 2020/0309466 A1 | 10/2020 | Mayberry et al. |
| 2021/0001403 A1* | 1/2021 | Kawai .................... B22F 12/90 |

FOREIGN PATENT DOCUMENTS

| | | |
|---|---|---|
| EP | 3970972 A1 | 3/2022 |
| JP | 2022049685 A | 3/2022 |
| WO | 2019091621 A1 | 5/2019 |

OTHER PUBLICATIONS

U.S. Appl. No. 17/022,259, Notice of Allowance dated Dec. 21, 2022, 14 pages.
U.S. Appl. No. 17/022,259, Office Action dated May 16, 2022, 27 pages.
European Search Report dated Feb. 9, 2022 for Application No. 21195384.9; pp. 10.
Kuo, Chil-Chyuan et al.; "A surface quality improvement apparatus for ABS parts fabricated by additive manufacturing"; The International Journal of Advanced Manufacturing Technology; Springer, London; vol. 89; No. 1; Jul. 7, 2016; pp. 635-642.
European Search Report and Written Opinion for corresponding EP Application No. 23156411 dated Jul. 6, 2023, 11 pages.

* cited by examiner

ALIGNING OF MELTING BEAM SOURCE IN ADDITIVE MANUFACTURING SYSTEM

BACKGROUND

Embodiments of the disclosure relate generally to additive manufacturing (AM) techniques. More specifically, embodiments of the disclosure relate to the aligning of a melting beam source in an AM system.

Conventional manufacture of metal components generally includes milling or cutting away regions from a slab of material before treating and modifying the cut material to yield a part, which may have been simulated using computer models, e.g., in drafting software. Manufactured components which may be formed from metal can include, e.g., airfoil components for installation in a turbomachine such as an aircraft engine or power generation system. Additive manufacturing (AM) includes a wide variety of processes of producing a component through the successive layering and sintering of material rather than the removal of material. As such, additive manufacturing can create complex geometries without the use of any sort of tools, molds, or fixtures, and with little or no waste material. Instead of machining components from solid billets of material, much of which is cut away and discarded, the only material used in additive manufacturing is what is required to shape the component.

Additive manufacturing has proven to be an efficient and effective mechanism for producing highly variable components. However, flaws may arise from the design of a part itself, and/or underlying problems with the additive manufacturing equipment. In many cases, it can be difficult to discern whether defects on a part are caused by issues not pertaining to the original design of the part to be manufactured.

BRIEF DESCRIPTION

All aspects, examples and features mentioned below can be combined in any technically possible way.

Aspects of the disclosure provide a method for aligning a melting beam source in an additive manufacturing (AM) system, the method including: forming a first test article with the AM system on a first location of a build plate, the first test article having a first shape; forming a second test article with the AM system on a second location of the build plate, the second test article having a second shape different from the first shape; measuring a vertical scale and a vertical alignment of the melting beam source based on the first test article; measuring a horizontal scale and a horizontal alignment of the melting beam source based on the second test article; determining whether at least one of the vertical scale, the vertical alignment, the horizontal scale, or the horizontal alignment of the melting beam source is not within a corresponding tolerance of a target specification; and in response to the at least one of the vertical scale, the vertical alignment, the horizontal scale, or the horizontal alignment not being within the corresponding tolerance, adjusting the melting beam source of the AM system to align the melting beam source to yield the target specification.

Another aspect of the disclosure includes any of the preceding aspects, and wherein the first location and the second location are each within a peripheral area of the build plate, and further comprising forming an AM component on a non-peripheral area of the build plate.

Another aspect of the disclosure includes any of the preceding aspects, and further including: forming a first portion of the AM component before adjusting the melting beam source of the AM system; and forming a second portion of the AM component after adjusting the melting beam source of the AM system.

Another aspect of the disclosure includes any of the preceding aspects, and wherein the first test article includes: a body on the build plate having a forward face and a rearward face opposite the forward face; a first surface extending between the forward face and the rearward face of the body, and including a plurality of protrusions for removable coupling of the body to a build plate; and a second surface on the body extending between the forward face and the rearward face of the body, the second surface including a plurality of angled flat surface portions, each of the plurality of angled flat surface portions having a distinct angle with respect to the horizontal plane, wherein an angular difference between each adjacent angled flat surface portion in the plurality of angled flat surface portions is substantially uniform.

Another aspect of the disclosure includes any of the preceding aspects, and wherein the second test article includes: a plurality of supports on the build plate; and a cylindrical body on the plurality of supports.

Another aspect of the disclosure includes any of the preceding aspects, and wherein the first shape is non-symmetrical with respect to a horizontal plane, and wherein the second shape is symmetrical with respect to the horizontal plane.

Another aspect of the disclosure includes any of the preceding aspects, and further including: measuring a separation distance between the first test article and the second test article on build plate; determining whether the separation distance is within a separation tolerance; and adjusting the melting beam source of the AM system to align the melting beam source to yield the target specification in response to determining the separation distance not being within the separation tolerance.

Further aspects of the disclosure provide a program product stored on a computer readable storage medium for aligning a melting beam source in an additive manufacturing (AM) system, the computer readable storage medium including program code for causing a computer system to perform actions including: causing the AM system to form a first test article on a first location of a build plate, the first test article having a first shape; causing the AM system to form a second test article on a second location of the build plate, the second test article having a second shape different from the first shape; measuring a vertical scale and a vertical alignment of the melting beam source based on the first test article; measuring a horizontal scale and a horizontal alignment of the melting beam source based on the second test article; determining whether at least one of the vertical scale, the vertical alignment, the horizontal scale, or the horizontal alignment of the melting beam source is not within a corresponding tolerance of a target specification; and in response to the at least one of the vertical scale, the vertical alignment, the horizontal scale, or the horizontal alignment not being within the corresponding tolerance, adjusting the melting beam source of the AM system to align the melting beam source to yield the target specification.

Another aspect of the disclosure includes any of the preceding aspects, and wherein the first location and the second location are each within a peripheral area of the build plate, and further comprising program code for causing the AM system to form an AM component on a non-peripheral area of the build plate.

Another aspect of the disclosure includes any of the preceding aspects, and further including program code for:

causing the AM system to form a first portion of the AM component before adjusting the melting beam source of the AM system; and causing the AM system to form a second portion of the AM component after adjusting the melting beam source of the AM system.

Another aspect of the disclosure includes any of the preceding aspects, and wherein the first test article includes: a body on the build plate having a forward face and a rearward face opposite the forward face; a first surface extending between the forward face and the rearward face of the body, and including a plurality of protrusions for removable coupling of the body to a build plate; and a second surface on the body extending between the forward face and the rearward face of the body, the second surface including a plurality of angled flat surface portions, each of the plurality of angled flat surface portions having a distinct angle with respect to the horizontal plane, wherein an angular difference between each adjacent angled flat surface portion in the plurality of angled flat surface portions is substantially uniform.

Another aspect of the disclosure includes any of the preceding aspects, and wherein the second test article includes: a plurality of supports on the build plate; and a cylindrical body on the plurality of supports.

Another aspect of the disclosure includes any of the preceding aspects, and wherein the first shape is non-symmetrical with respect to a horizontal plane, and wherein the second shape is symmetrical with respect to the horizontal plane.

Another aspect of the disclosure includes any of the preceding aspects, and further including program code for: measuring a separation distance between the first test article and the second test article on build plate; determining whether the separation distance is within a separation tolerance; and adjusting the melting beam source of the AM system to align the melting beam source to yield the target specification in response to determining the separation distance not being within the separation tolerance.

Another aspect of the disclosure provides a system including: an additive manufacturing (AM) system having a melting beam source for building a component on a build plate; and a controller in communication with the melting beam source of the AM system, the controller being operable to: cause the AM system to form a first test article on a first location of a build plate, the first test article having a first shape; cause the AM system to form a second test article on a second location of the build plate, the second test article having second shape different from the first shape; measure a vertical scale and a vertical alignment of the melting beam source based on the first test article; measure a horizontal scale and a horizontal alignment of the melting beam source based on the second test article; determine whether at least one of the vertical scale, the vertical alignment, the horizontal scale, or the horizontal alignment of the melting beam source is not within a corresponding tolerance of a target specification; and in response to the at least one of the vertical scale, the vertical alignment, the horizontal scale, or the horizontal alignment not being within the corresponding tolerance, adjust the melting beam source of the AM system to align the melting beam source to yield the target specification.

Another aspect of the disclosure includes any of the preceding aspects, and wherein the first location and the second location are each within a peripheral area of the build plate, and further comprising program code for causing the AM system to form an AM component on a non-peripheral area of the build plate.

Another aspect of the disclosure includes any of the preceding aspects, and wherein the first test article includes: a body on the build plate having a forward face and a rearward face opposite the forward face; a first surface extending between the forward face and the rearward face of the body, and including a plurality of protrusions for removable coupling of the body to a build plate; and a second surface on the body extending between the forward face and the rearward face of the body, the second surface including a plurality of angled flat surface portions, each of the plurality of angled flat surface portions having a distinct angle with respect to the horizontal plane, wherein an angular difference between each adjacent angled flat surface portion in the plurality of angled flat surface portions is substantially uniform.

Another aspect of the disclosure includes any of the preceding aspects, and wherein the second test article includes: a plurality of supports on the build plate; and a cylindrical body on the plurality of supports.

Another aspect of the disclosure includes any of the preceding aspects, and wherein the first shape is non-symmetrical with respect to a horizontal plane, and wherein the second shape is symmetrical with respect to the horizontal plane.

Another aspect of the disclosure includes any of the preceding aspects, and wherein the controller is further configured to: measure a separation distance between the first test article and the second test article on build plate; determine whether the separation distance is within a separation tolerance; and adjust the melting beam source of the AM system to align the melting beam source to yield the target specification in response to determining the separation distance not being within the separation tolerance.

Two or more aspects described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements among the drawings.

DETAILED DESCRIPTION

As indicated above, the disclosure provides a first, test article formed by additive manufacturing (AM), and related methods for using the first, test article to align melting beam sources in an AM system to control the building of concurrently and/or subsequently built AM components. One or more built AM components according to embodiments of the disclosure may be manufactured together with one or more test articles on a single build plate and/or AM system. The built AM component(s) may be used in an actual device (e.g., turbomachine and/or other piece of mechanical hardware), while the test articles in some cases may serve substantially no practical use in the actual device. In the case of a turbomachine, the AM component(s) may include, in various examples, airfoils, and/or non-airfoil structures, including wheels, diaphragms, shrouds, etc. The AM components, because they are built together with the test article (s), will have structural artifacts caused by various settings within the AM system, e.g., flat angled surfaces, curves, openings, etc., that differ from an ideal shape of the AM component (stored, e.g., in a geometrical specification as discussed herein).

Embodiments of the disclosure may be implemented in the form of a method, program product, system, and/or other solution for providing the operational methodologies discussed herein. Embodiments of the disclosure may be used to additively manufacture multiple test articles in selected regions of a build plate (e.g., peripheral areas where actual parts are not otherwise manufactured). Through measuring and analyzing the structure of such test articles, an AM system can automatically analyze for melting beam source scaling, melting beam source calibration, and related metrics such as total build time. Further processing may use such analysis to adjust the alignment of melting beam sources in the AM system, e.g., for use in building subsequent portions of a part or other parts made on the same build plate. Embodiments of the disclosure thus provide quantitative analysis for part quality and long-term quality of a machine where the part will be used, as well as features for automatically adjusting melting beam source alignment to improve build quality.

Figure 1:
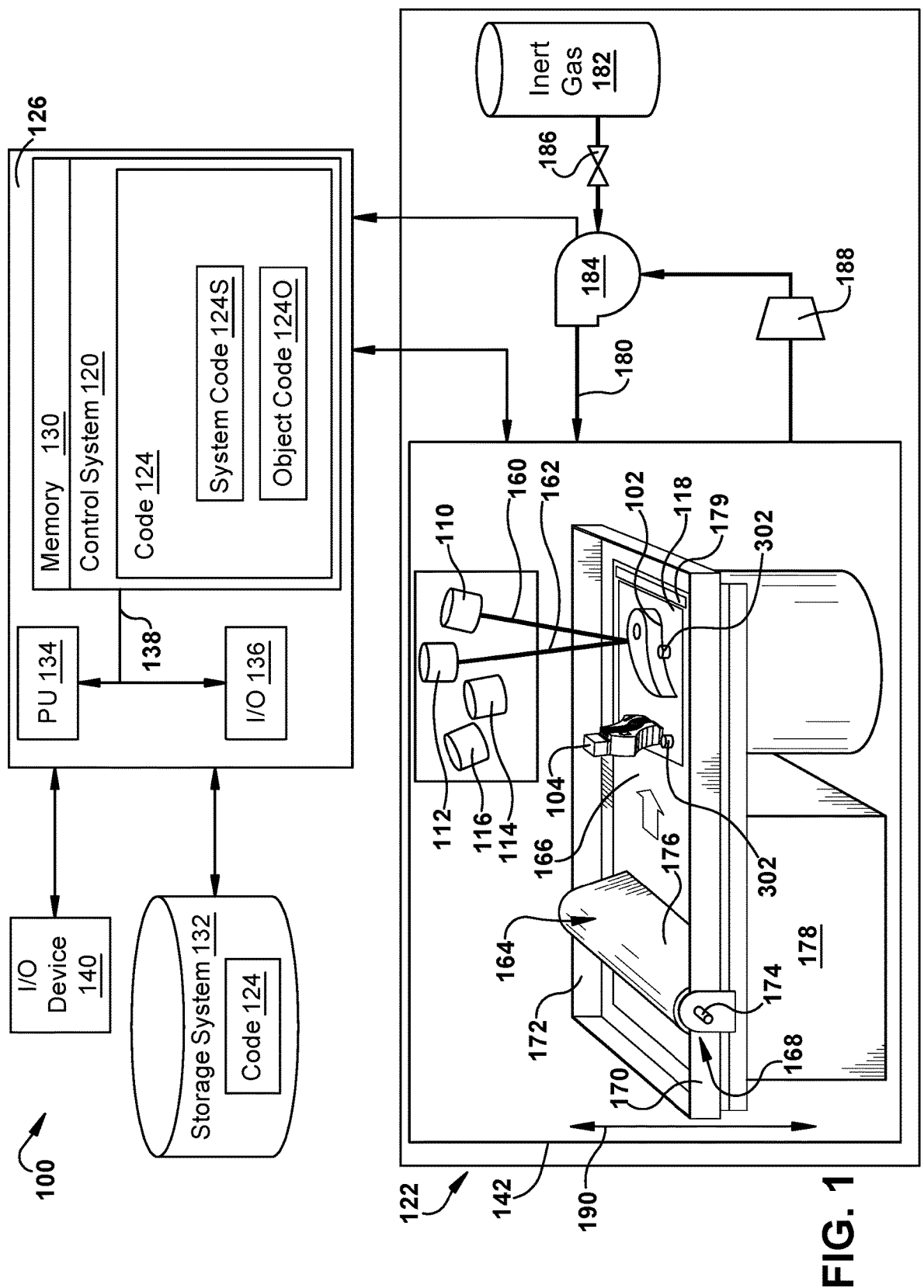
FIG. 1 shows a block diagram of an illustrative additive manufacturing system and process including a non-transitory computer readable storage medium storing code representative of components to be formed according to embodiments of the disclosure.

Referring now to the drawings, in which like numerals refer to like elements throughout the several views, FIG. 1 shows a schematic/block view of an illustrative computerized metal powder additive manufacturing system 100 (hereinafter 'AM system 100') for initially generating additively manufactured (AM) component(s) 102, and at least one (first) first test article 104. AM component 102 may include one large AM component or multiple AM components, and only one AM component 102 is shown for ease of illustration. Similarly, multiple test articles 104 may be formed with AM system 100 together with one or more AM components 102. The teachings of the disclosure may be applied to any conceivable AM component(s) 102 built using AM system 100. AM system 100 uses multiple melting beam sources (simply "beam sources" hereafter), e.g., four beam sources 110, 112, 114, 116, but it is emphasized and will be readily recognized that the teachings of the disclosure are equally applicable to build multiple AM components 102 or a single AM component 102 using any number of beam sources, i.e., one or more.

In this example, AM system 100 is arranged for direct metal beam source melting (DMLM). It is understood that the general teachings of the disclosure are applicable to other forms of metal powder additive manufacturing such as but not limited to direct metal laser sintering (DMLS), selective laser sintering (SLS), electron beam melting (EBM), and perhaps other forms of additive manufacturing. AM component(s) 102 are illustrated in FIG. 1 as elements with the geometrical profile of an airfoil; however, it is understood that the additive manufacturing process can be readily adapted to manufacture any component shape, including those with internal openings, on build plate 118.

AM system 100 generally includes a metal powder additive manufacturing control system 120 ("control system") and an AM printer 122. As will be described, control system 120 executes set of computer-executable instructions or program code 124 to generate AM component(s) 102 and test article(s) 104 using multiple beam sources 110, 112, 114, 116. Control system 120 is shown implemented on controller 126 as computer program code. To this extent, controller 126 is shown including a memory 130 and/or storage system 132, a processor unit (PU) 134, an input/output (I/O) interface 136, and a bus 138. Further, controller 126 is shown in communication with an external I/O device/resource 140 and storage system 132.

In general, processor unit (PU) 134 executes computer program code 124 that is stored in memory 130 and/or storage system 132. While executing computer program code 124, processor unit (PU) 134 can read and/or write data to/from memory 130, storage system 132, I/O device 140 and/or AM printer 122. Bus 138 provides a communication link between each of the components in controller 126, and I/O device 140 can comprise any device that enables a user to interact with controller 126 (e.g., keyboard, pointing device, display, etc.). Controller 126 is only representative of various possible combinations of hardware and software. For example, processor unit (PU) 134 may comprise a single processing unit or be distributed across one or more processing units in one or more locations, e.g., on a client and server. Similarly, memory 130 and/or storage system 132 may reside at one or more physical locations. Memory 130 and/or storage system 132 can comprise any combination of various types of non-transitory computer readable storage medium including magnetic media, optical media, random access memory (RAM), read only memory (ROM), etc. Controller 126 can comprise any type of computing device such as an industrial controller, a network server, a desktop computer, a laptop, a handheld device, etc.

As noted, AM system 100, including control system 120, executes program code 124 to generate AM component(s) 102 and/or test article(s) 104. Program code 124 can include, inter alia, a set of computer-executable instructions (herein referred to as 'system code 124S') for operating AM printer 122 or other system parts, and a set of computer-executable instructions (herein referred to as 'object code 124O') defining AM component(s) 102 and/or test article(s) 104 to be physically generated by AM printer 122. As described herein, additive manufacturing processes begin with a non-transitory computer readable storage medium (e.g., memory 130, storage system 132, etc.) storing program code 124. Set of computer-executable instructions for operating AM printer 122 may include any now known or later developed software code capable of operating AM printer 122. It is thus understood that one or more operational methodologies discussed herein may be implemented as, or as part of, a computer program product having program code 124 executable via controller 126.

Object code 124O defining AM component(s) 102 and/or test article(s) 104 may include a precisely defined 3D model of an AM component 102 and/or test article(s) 104 and can be generated from any of a large variety of well-known computer aided design (CAD) software systems such as AutoCAD®, TurboCAD®, DesignCAD 3D Max, etc. In this regard, object code 124O can include any now known or later developed file format. Furthermore, object code 124O representative of AM component(s) 102 may be translated between different formats. For example, object code 124O may include Standard Tessellation Language (STL) files which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional AM component to be fabricated on any AM printer. Object code 124O representative of component(s) 102, 104 may also be converted into a set of data signals and transmitted, received as a set of data signals, and converted to code, stored, etc., as necessary. In any event, object code 124O may be an input to AM system 100 and may come from a part designer, an intellectual property (IP) provider, a design company, the operator, or owner of AM system 100, or from other sources. In any event, control system 120 executes system code 124S and object code 124O, dividing AM component(s) 102 and/or test article(s) 104 into a series of thin slices that AM printer 122 assembles in successive layers of material.

AM printer 122 may include a processing chamber 142 that is sealed to provide a controlled atmosphere for AM component(s) 102 and/or test article(s) 104 printing, e.g., a set pressure and temperature for beam sources, or a vacuum for electron beam melting. Build plate 118, upon which AM component(s) 102 and/or test article(s) 104 is/are built, is positioned within processing chamber 142. Several beam sources 110, 112, 114, 116 are configured to melt layers of metal powder on build plate 118 to generate AM component(s) 102 and/or first test article(s) 104. While four beam sources 110, 112, 114, 116 will be described herein, it is emphasized that the teachings of the disclosure are applicable to a system employing any number of sources, e.g., one, five, or more.

Continuing with FIG. 1, an applicator 164 may create a thin layer of raw material 166 spread out as the blank canvas from which each successive slice of the final components 101, 104 will be created. Applicator 164 may move under control of a linear transport system 168. Linear transport system 168 may include any now known or later developed arrangement for moving applicator 164. In one embodiment, linear transport system 168 may include a pair of opposing rails 170, 172 extending on opposing sides of build plate 118, and a linear actuator 174 such as an electric motor coupled to applicator 164 for moving it along rails 170, 172. Linear actuator 174 is controlled by control system 120 to move applicator 164. Other forms of linear transport systems may also be employed. Applicator 164 may take a variety of forms. In one embodiment, applicator 164 may include a member 176 configured to move along opposing rails 170, 172, and an actuator element (not shown in FIG. 1) in the form of a tip, blade or brush configured to spread metal powder evenly over build plate 118, i.e., build plate 118 or a previously formed layer of AM component(s) 102 and/or test article(s) 104, to create a layer of raw material. The actuator element may be coupled to member 176 using a holder (not shown) in any number of ways.

The process may use different raw materials 166 in the form of metal powder. Raw materials 166 may be provided to applicator 164 in several ways. In one embodiment, shown in FIG. 1, a stock of raw material 166 may be held in a raw material source 178 in the form of a chamber accessible by applicator 164. In other arrangements, raw material may be delivered through applicator 164, e.g., through member 176 in front of its applicator element and over build plate 118. In any event, an overflow chamber 179 may be provided on a far side of applicator 164 to capture any overflow of raw material not layered on build plate 118. In FIG. 1, only one applicator 164 is shown. In some embodiments, applicator 164 may be among a plurality of applicators in which applicator 164 is an active applicator and other replacement applicators (not shown) are stored for use with linear transport system 168. Used applicators (not shown) may also be stored after they are no longer usable.

In one embodiment, AM component(s) 102 and/or test article(s) 104 may be made of a metal which may include a pure metal or an alloy. In one example, the metal may include practically any non-reactive metal powder, i.e., non-explosive or non-conductive powder, such as but not limited to: a cobalt chromium molybdenum (CoCrMo) alloy, stainless steel, an austenite nickel-chromium based alloy such as a nickel-chromium-molybdenum-niobium alloy (NiCrMoNb) (e.g., Inconel 625 or Inconel 718), a nickel-chromium-iron-molybdenum alloy (NiCrFeMo) (e.g., Hastelloy® X available from Haynes International, Inc.), or a nickel-chromium-cobalt-molybdenum alloy (NiCrCoMo) (e.g., Haynes 282 available from Haynes International, Inc.), etc. In another example, the metal may include practically any metal such as but not limited to: tool steel (e.g., H13), titanium alloy (e.g., $Ti_6Al_4V$), stainless steel (e.g., 316L) cobalt-chrome alloy (e.g., CoCrMo), and aluminum alloy (e.g., $AlSi_{10}Mg$). In another example, the metal may include a gamma prime hardened superalloy such as but not limited to nickel-based superalloys like Inconel 738, MarM 247 or CM247, or cobalt-based superalloys such as but not limited to those known under their brand names: IN738LC, Rene 108, FSX 414, X-40, X-45, MAR-M509, MAR-M302 or Merl 72/Polymet 972.

The atmosphere within processing chamber 142 is controlled for the type of melting beam source being used. For example, for lasers, processing chamber 142 may be filled with an inert gas such as argon or nitrogen and controlled to minimize or eliminate oxygen. Here, control system 120 is configured to control a flow of an inert gas mixture 180 within processing chamber 142 from a source of inert gas 182. In this case, control system 120 may control a pump 184, and/or a flow valve system 186 for inert gas to control the content of gas mixture 180. Flow valve system 186 may include one or more computer controllable valves, flow sensors, temperature sensors, pressure sensors, etc., capable of precisely controlling flow of the gas. Pump 184 may be provided with or without valve system 186. Where pump 184 is omitted, inert gas may simply enter a conduit or manifold prior to introduction to processing chamber 142. Source of inert gas 182 may take the form of any conventional source for the material contained therein, e.g., a tank, reservoir, or other source. Any sensors (not shown) required to measure gas mixture 180 may be provided. Gas mixture 180 may be filtered using a filter 188 in a conventional manner. Alternatively, for electron beams, processing chamber 142 may be controlled to maintain a vacuum. Here, control system 120 may control a pump 184 to maintain the vacuum, and flow valve system 186, source of inert gas 182, and/or filter 188 may be omitted. Any sensors (not shown) necessary to maintain the vacuum may be employed.

A vertical adjustment system 190 may be provided to vertically adjust a position of various parts of AM printer 122 to accommodate the addition of each new layer, e.g., a build plate 118 may lower and/or chamber 142 and/or applicator 164 may rise after each layer. Vertical adjustment system 190 may include any now known or later developed linear actuators to provide such adjustment that are under the control of control system 120.

In operation, build plate 118 with metal powder thereon is provided within processing chamber 142, and control system 120 controls the atmosphere within processing chamber 142. Control system 120 also controls AM printer 122, including applicator 164 (e.g., linear actuator 174) and beam source(s) 110, 112, 114, 116 to sequentially melt layers of metal powder on build plate 118 to generate AM component(s) 102 and/or test article(s) 104 according to embodiments of the disclosure. As noted, various parts of AM printer 122 may vertically move via vertical adjustment system 190 to accommodate the addition of each new layer, e.g., a build plate 118 may lower and/or chamber 142 and/or applicator 164 may rise after each layer. Embodiments of the disclosure may use control system 120 of controller 126 to form multiple test articles 104 on build plate 118, each of which may be analyzed to control the alignment and/or operation of beam sources 110, 112, 114, 116 as discussed herein.

Figure 2:
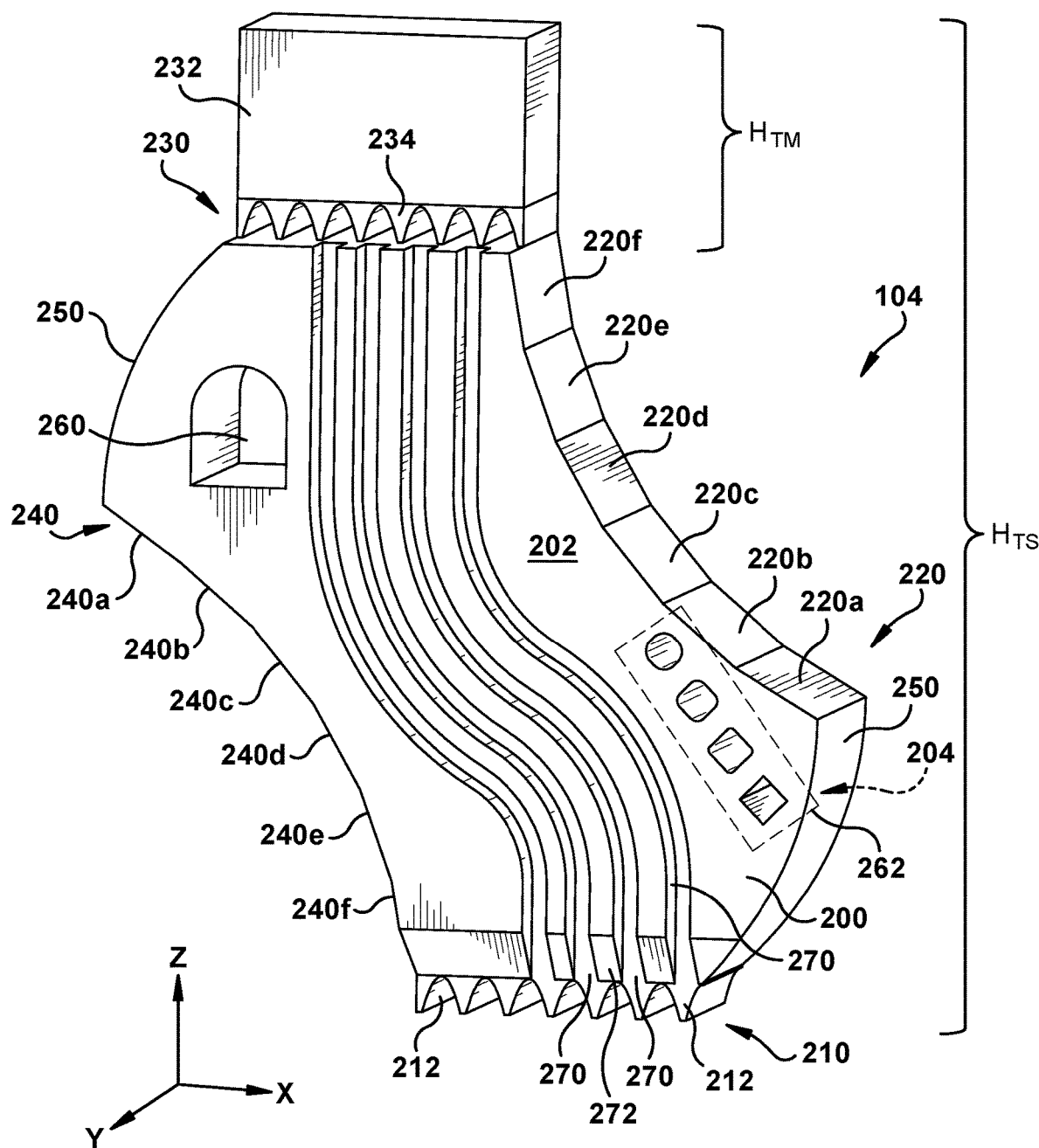
FIG. 2 shows a first perspective view of a first test article, according to embodiments of the disclosure.
Figure 3:
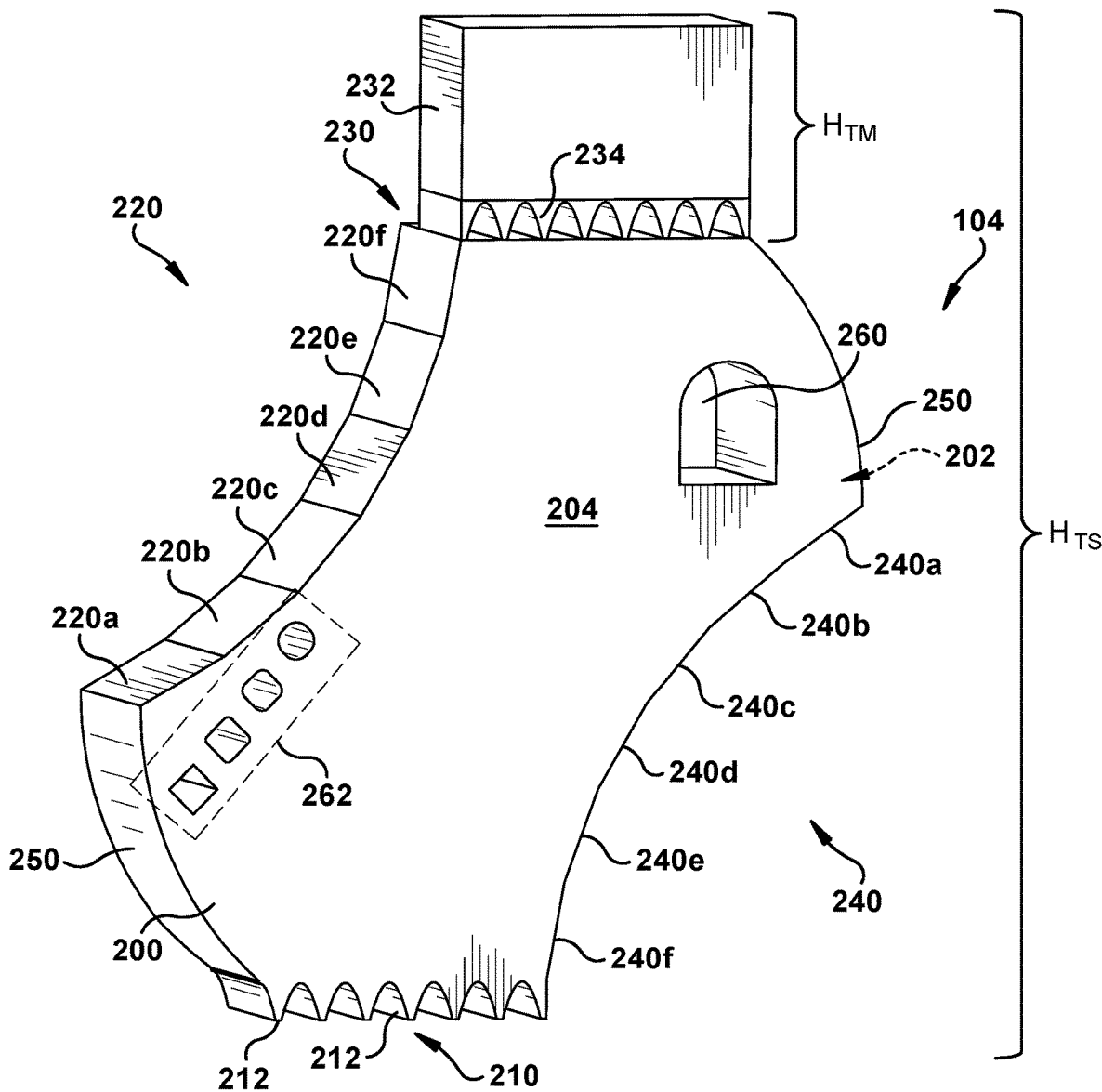
FIG. 3 shows a second perspective view of a first test article, according to embodiments of the disclosure.

Referring now to FIGS. 2 and 3, an example of a first test article 104 is shown according to embodiments of the disclosure. Front and back perspective views of first test article 104 are shown in X-Y-Z space within FIGS. 2 and 3, respectively. First test article 104 may be formed by operation of beam sources 110, 112, 114, 116 of additive manufacturing (AM) as described elsewhere herein and may be formed concurrently with AM component(s) 102 (FIG. 1). First test article 104 may be a distinct structure from AM component(s) 102 and may include various geometrical features for analyzing the build quality of AM component(s) 102 formed on the same build plate (e.g., build plate 118) as first test article 104.

First test article 104 may include a body 200 with a forward face 202 oriented toward a first direction (e.g., the positive Y direction in FIGS. 2, 3), and a rearward face 204 oriented toward a second direction (e.g., the negative Y direction in FIGS. 2, 3). For the purposes of explanation, the term "forward" denotes the positive Y direction, "rearward" denotes the negative Y direction, "horizontal" refers to the direction of the X axis, and "vertical" refers to the direction of the Z axis. It is understood that these terms may be interchanged and/or substituted, based on the perspective from which first test article 104 is viewed. Body 200 may be made by any metal powder additive manufacturing process, such as that described relative to FIG. 1. Body 200 and its various components discussed herein may be made using any of the above-described metal powders. Such materials may be used in conjunction with, or as a substitute for, one or more of the various example laser-sinterable metals and/or other additively manufactured materials discussed elsewhere herein. In such cases, body 200 may include aluminum, titanium, nickel, cobalt, iron, and/or other currently known or later developed metals. Body 200 may be shaped such that it is physically asymmetric with respect to horizontal plane X-Y (herein horizontal plane or plane X-Y), e.g., about a centerline axis A thereof. In this context, the term "asymmetric" refers to the geometrical profile of body 200 in plane X-Y being dependent on the direction of travel from centerline axis A. A body that is "symmetric" in a horizontal plane will have the same geometrical profile regardless of the direction of travel from its centerline axis. The asymmetry of body 200 with respect to the horizontal plane may allow first test article 104 to act as a single component for detecting misalignment and/or other errors in various beam sources used to create first test article 104.

Body 200 of first test article 104 may include various structural features for testing build quality, e.g., of AM component 102 in AM system 100, based on physical attributes of first test article 104. For instance, first test article 104 may include a first surface 210 on body 200, e.g., a lowermost vertical surface, extending between forward face 202 and rearward face 204. First surface 210 may include multiple protrusions 212 for removable coupling of body 200 to build plate 118 (FIG. 1). Each protrusion 212 may be formed, e.g., by forming multiple thin supports of additively manufacturable material with openings therebetween, to allow body 200 to be removed more easily removed from build plate 118 thereunder. Thus, when first test article 104 is formed using AM system 100, body 200 may be removably coupled to build plate 118 at first surface 210.

Body 200 may include a second surface 220 extending between forward face 202 and rearward face 204 of body 200. Second surface 220 may include, and in some cases may be defined by, a first plurality of angled flat surface portions (identified separately as 220a, 220b, 220c, 220d, 220e, 220f, respectively). Although six angled flat surface portions 220a, 220b, 220c, 220d, 220e, 220f are provided as an example in FIGS. 2-4, it is understood that as few as two angled flat surface portions, or several dozen or more angled flat surface portions, may be formed within second surface 220 of first test article 104. Angled flat surface portions 220a, 220b, 220c, 220d, 220e, 220f may be considered "flat" by being substantially planar, i.e., having a two-dimensional structure and by having substantially no component in the direction normal to their two-dimensional plane. It is thus understood that each angled flat surface portion 220a, 220b, 220c, 220d, 220e, 220f may not be contained entirely within an X-Y, Y-Z, and/or X-Z plane, but may be substantially two-dimensional within respective planes extending at an angle with respect to any or all these planes.

Body 200 of first test article 104 may include a third surface 230 extending between forward face 202 and rearward face 204. Third surface 230 may be opposite first surface 210 and thus may define an uppermost surface of body 200 (FIG. 2), as illustrated. Third surface 230 can be optionally structured as an attachment point for additional structures to test the build quality of AM system 100. First test article 104 thus may include an elongated member 232 (expanded view shown in FIG. 4) positioned on, and removably coupled to third surface 230 of body 200. A set of protrusions 234 may be similar or identical in their structure to protrusion 212 on first surface 210 of body 200, and thus may allow elongated member 232 to be detached from body 200 after its manufacture with AM system 100.

Figure 4:
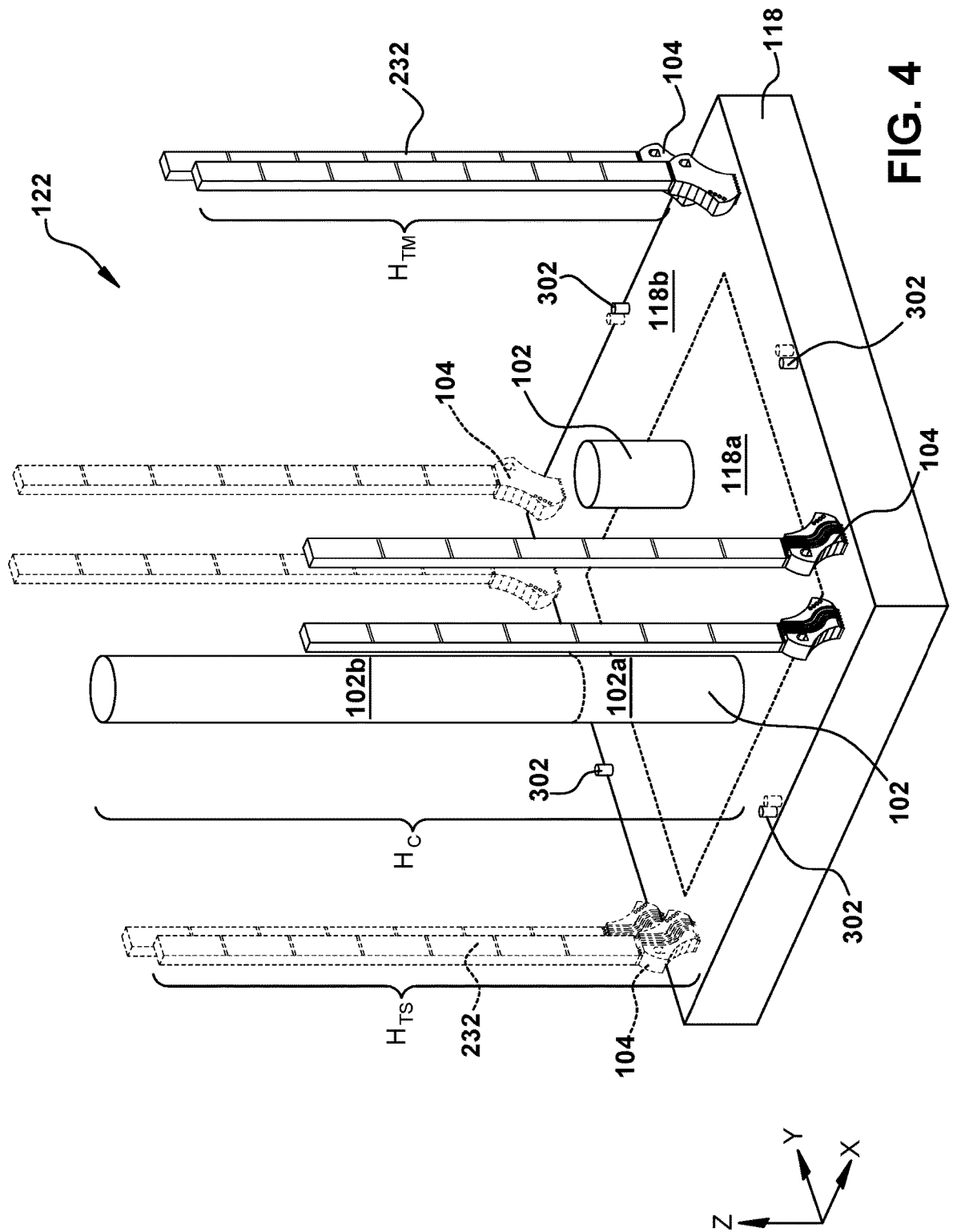
FIG. 4 shows a perspective view with an additively manufactured (AM) component with other components to be formed according to embodiments of the disclosure.

Referring to FIGS. 2-4, elongated member 232 may be formed of the same material(s) as body 200 and may have a height $H_{TM}$ above body 200 that may be the same as, or different from, a height $H_C$ (FIG. 4 only) of AM component(s) 102 (FIG. 4) above build plate 118. Height $H_{TM}$ of elongated member 232 in FIG. 4 is depicted as being less than height $H_C$ of AM component 102. In other cases, the height $H_{TM}$ of elongated member 232 of first test article 104 may be approximately equal to height $H_C$ of AM component 102. In such circumstances, height $H_{TM}$ of elongated member 232 may represent most of the height of first test article 104. However embodied, height $H_{TM}$ of elongated member 232 may be based at least partially on the height of an AM component(s) 102 that is also formed on build plate 118. Elongated member 232 can be used, e.g., to test whether material density is uniform and/or at least equal to a target at several vertical positions (i.e., along the Z axis). The total height of first test article 104 may be the sum of the height of body 200 and elongated member 232, indicated as a total height $H_{TS}$ of first test article 102.

Returning to FIGS. 2 and 3, body 200 may include a fourth surface 240 extending between forward face 202 and rearward face 204 of body 200. Fourth surface 240 may be similar or identical to second surface 220 but may be shaped to examine the build quality of vertically-downward angled surfaces. Thus, fourth surface 240 may include a second plurality of angled flat surface portions (identified separately as 240a, 240b, 240c, 240d, 240e, 240f, respectively). Although six angled flat surface portions 240a, 240b, 240c, 240d, 240e, 240f are provided as an example in FIGS. 2 and 3, it is understood that as few as two angled flat surface portions, or several dozen or more angled flat surface portions, may be formed within fourth surface 240 of first test article 104. Angled flat surface portions 240a, 240b, 240c, 240d, 240e, 240f, like portions 220a, 220b, 220c, 220d, 220e, may be considered "flat" by being substantially planar as discussed elsewhere herein with respect to other "flat" components.

Body 200 further may include one or more curved surfaces 250 between forward face 202 and rearward face 204 to indicate the build quality of non-linear surfaces on AM component 102. Although two curved surfaces 250 are shown on body 200 as an example, it is understood that a larger or smaller number of curved surfaces 250 may be provided. Curved surface(s) 250 may extend, e.g., within the X-Z plane, between first surface 210 and second surface 220, between third surface 230 and fourth surface 240, and/or between further combinations of these surfaces in various alternative configurations. In embodiments where multiple curved surfaces 250 are included, the length, curvature, and/or other attributes of each curved surfaces 250 optionally may differ from each other to further indicate build quality of multiple curved geometries. Where included in body 200, each curved surface 250 may have a predefined radius of, e.g., approximately 50 millimeters (mm), or otherwise a radius that is approximately half of the horizontal length of its adjacent first surface 210 and/or third surface 230.

First test article 104 optionally may include one or more openings 260 within body 200. Opening(s) 260, where included, may extend from forward face 202 of body 200 to rearward face 204 of body 200. Opening(s) 260 may be of any conceivable shape and/or size, and may include a combination of flat, flat angled, and/or curved surfaces to indicate the build quality of such surfaces inside of opening(s) 260. To further indicate the build quality of AM component(s) 102, opening(s) 260 may be free of support members therein. That is, there may be no transversely extending components of first test article 104 within opening(s) 260. Support members may be omitted from within opening(s) 260 to better indicate whether any similar openings within AM component(s) 102 that are inaccessible to inspectors, probes, etc., contain defects.

In some cases, first test article 104 may include a plurality of openings 262 within body 200. Plurality of openings 262 may differ from opening(s) 260, e.g., in that each opening of plurality of openings 262 features a distinct geometrical profile. The distinct geometrical profile of each opening in plurality of openings 262 may allow first test article 104 to indicate build quality of multiple types of openings simultaneously, without using multiple bodies 200. Plurality of openings 262 may feature geometries such as a rounded opening 262a, a partially rounded opening 262b (i.e., linear sides connected with curved portions), a partially rectangular opening 262c (i.e., linear sides connected with curved corners), and a rectangular opening 262d. Further geometries within plurality of openings 262 are possible, and the examples illustrated in FIGS. 2-4, and 6 are non-limiting examples. In further implementations, openings 262 may have similar shapes but distinct radii. For example, one or more of openings 262 may have no curved surfaces (e.g., ninety degree angles), with further openings having curved surfaces with gradually increasing radii (e.g., 0.25 millimeter (mm). 0.50 mm, 0.75 mm, etc.) The radii of adjacent openings 262 may increase linearly (e.g., by constant difference), and/or randomly or exponentially. Furthermore, openings 262 may have the same radii oriented upward, downward, and/or alternate horizontal directions, or may vary based on directional phasing in further implementations. However embodied, first test article(s) 104 with plurality of opening(s) 262 can be mounted and inspected with the aid of tools such as microscopes, profilometers, etc., as described herein.

As shown in FIG. 2, first test article 104 may additionally or alternatively include, e.g., one or more curvilinear channels 270 within body 200. Curvilinear channel(s) 270 may be formed in only one face of body 200 (e.g., forward face 202) without being formed in the other opposing face (e.g., rearward face 204). In further examples, curvilinear channel(s) 270 may be formed in forward face 202 and rearward face 204 of body 200. Curvilinear channel(s) 270, unlike opening(s) 260 and/or plurality of opening(s) 262, may extend at most partially into body 200 without extending from one face (e.g., forward face 202) to the other (e.g., rearward face 204). Curvilinear channel(s) 270, when formed in first test article 104, may indicate the build quality of similar channels formed within AM component 102 (FIG. 1).

Curvilinear channel(s) 270 may allow a fabricator to measure the build quality of thin walls within the structure of AM component(s) 102. To provide this feature, a portion 272 of forward face 202 between two curvilinear channels 270 may have a thickness that is at most equal to one of curvilinear channel(s) 270 (e.g., at most approximately five millimeters). Limiting the thickness of portion 272 to being at most equal to the size of its adjacent curvilinear channel(s) 270 may allow first test article 104 to indicate the build quality of thin walls, without such walls being formed elsewhere on body 200. Moreover, in cases where rearward face 204 is free of curvilinear channel(s) 270, first test article 104 can indicate the build quality of larger flat surfaces. Thus, at least a portion of first test article 104 may be free of opening(s) 260, plurality of opening(s) 262, and/or curvilinear channel(s) 270, to indicate the build quality flat surfaces.

Figure 5:
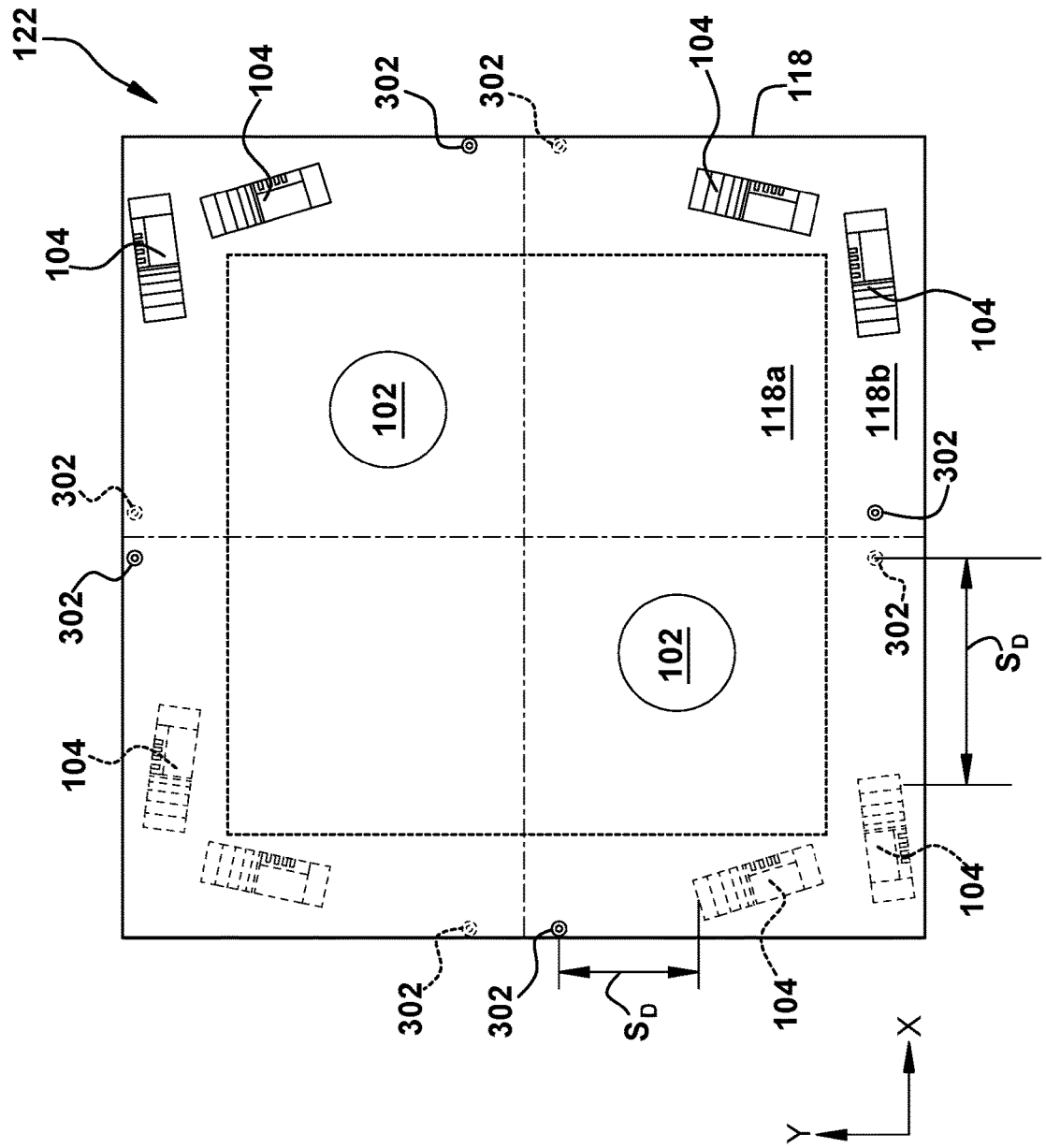
FIG. 5 shows a plan view of an AM component with other components to be formed according to embodiments of the disclosure.

Referring now to FIGS. 4 and 5, in which FIG. 4 provides a perspective view of an AM printer 122 in which multiple AM components 102, (first) test articles 104, and a set (i.e., one or more) of second test articles 302 are formed. Components 102, 104, 302 thereafter can be analyzed to align beam source(s) 110, 112, 114, 116 (FIG. 1) according to various methodologies discussed herein. AM component(s) 102 may be produced concurrently with one or more of test articles 104, 302 that may be analyzed as representative of an instance in which AM system 100 is used. In the example shown in FIGS. 4 and 5, one AM component 102, two or more of first test articles 104, and two or more second test components 302 are shown to be formed together on build plate 118. Some first test articles 104 and some second test components 302 are depicted in dashed lines, e.g., to indicate that the number and location of test articles 104, 302 can vary between applications. However, it is understood that a larger or smaller number of AM components 102 as well as test articles 104, 302 may be formed on build plate 118. In this case, various attributes of AM component 102 (e.g., density, channel shape, wall shape, orientation of angled surfaces, etc.) may be determined and used to align beam source(s) 110, 112, 114, 116 based on test articles 104, 302 and without direct analysis of AM component 102. AM components 102 may be formed in a non-peripheral area 118a of build plate 118, whereas test articles 104, 302 may be formed in a peripheral area 118b that is exterior to non-peripheral area 118a. Each second test article 302 may be separated from a corresponding first test article 104 in plane X-Y, e.g., by a corresponding separation distance $S_D$. Separation distance $S_D$ may be measured with respect to the X or Y axis and may represent the horizontal distance between test articles 104, 302 within peripheral area 118b. Peripheral area 118b generally may be defined as portions of build plate 118 located outside a predetermined surface area, and/or portions of build plate 118 where functional portions of a device are not built. According to an example, non-peripheral area 118a may be defined as a substantially rectangular or square surface area within plane X-Y. In one non-limiting example, non-peripheral area 118a is approximately five-hundred micrometers (μm) by approximately five-hundred inn. Peripheral area 118b may include all portions of build plate 118 that are outside non-peripheral area 118a in plane X-Y.

Figure 6:
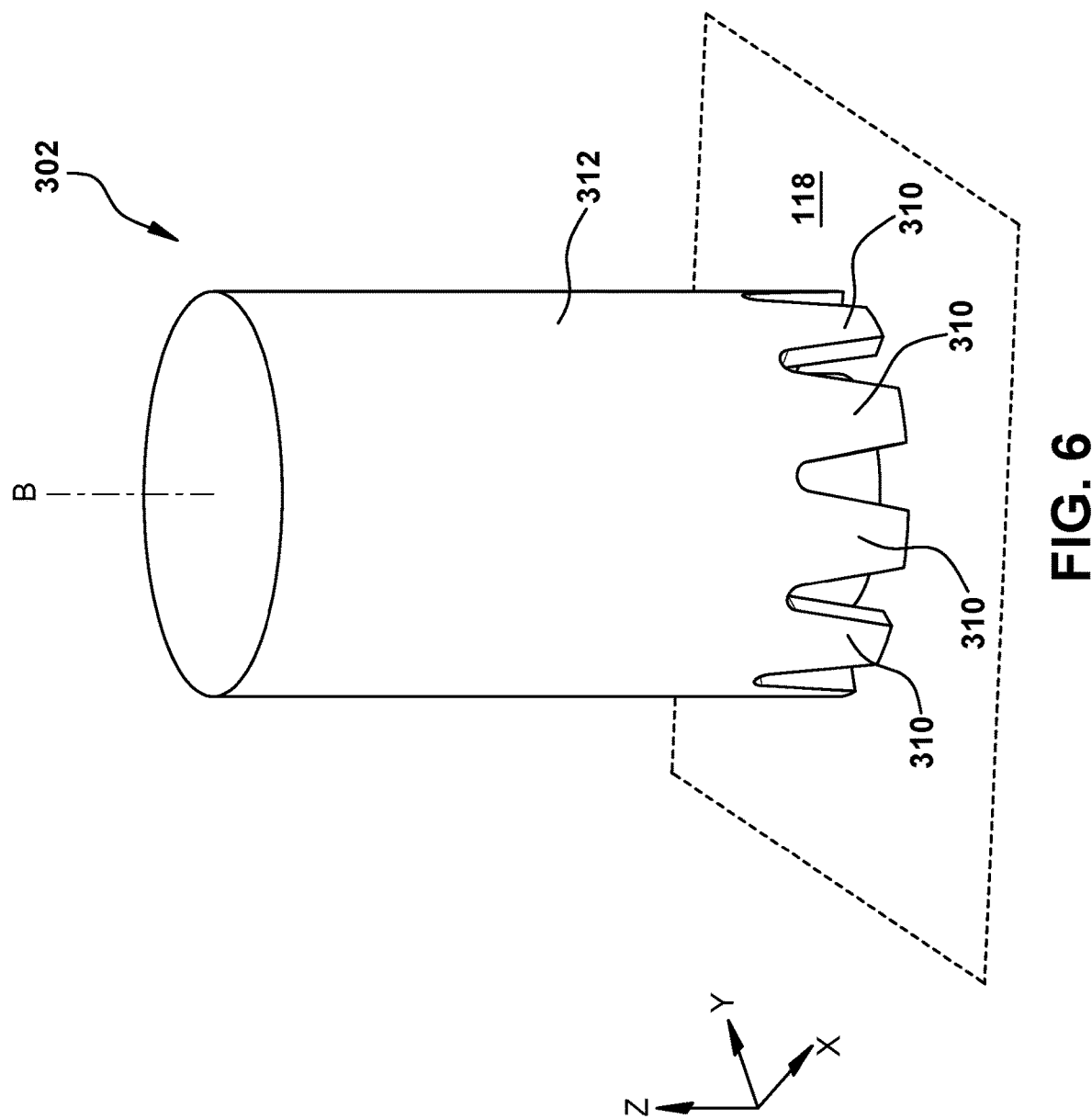
FIG. 6 shows a perspective view of a second test article, according to embodiments of the disclosure.

Turning briefly to FIG. 6, various structural attributes of second test article 302 are illustrated. Second test article 302 may be formed, e.g., to analyze a horizontal scale and horizontal alignment of AM system 100 (FIG. 1) in embodiments of the disclosure. Second test article 302 may include any conceivable geometry capable of being symmetrical in the horizontal plane. Second test article 302 may have a vertical centerline axis B (extending, e.g., in parallel with the Z axis) and the shape of second test article 302, however embodied, may be symmetrical with respect to the horizontal plane. That is, the geometric profile of second test article 302 may be the same regardless of reference direction from centerline axis B. According to an example, second test article 302 may include a plurality of supports 310 on build plate 118. Plurality of supports 310 may include, e.g., regions of AM material alternating with regions of vacant space to define perforations on build plate 118. Supports 310 may decrease the amount of material needed to form second test article 302, and further may allow second test article 302 to be removed easily from build plate 118.

In one example, second test article 302 may have a cylindrical body 312 on supports 310 second test article 302. Other types of geometries, e.g., cubic, conic, rounded, etc., may be used in further implementations. For instance, in plane X-Y, second test article may have geometrical profiles including, e.g., rounded, triangular, hexagonal, octagonal, dodecahedron, and/or other types of non-regular geometries (e.g., plus sign, chevron, etc.). In still further implementations, second test article 302 may have the same shape as first test article 104 and/or may have a height above build plate 118 that is greater than first test article 104. In the case of a cylindrical shape, cylindrical body 312 may be included, e.g., to simultaneously examine linear and curvilinear build surfaces of second test article 302, as well as build density of materials above supports 310. It is emphasized, however, that non-cylindrical bodies may be on supports 310 to analyze build quality using a variety of shapes and/or component types.

Figure 7:
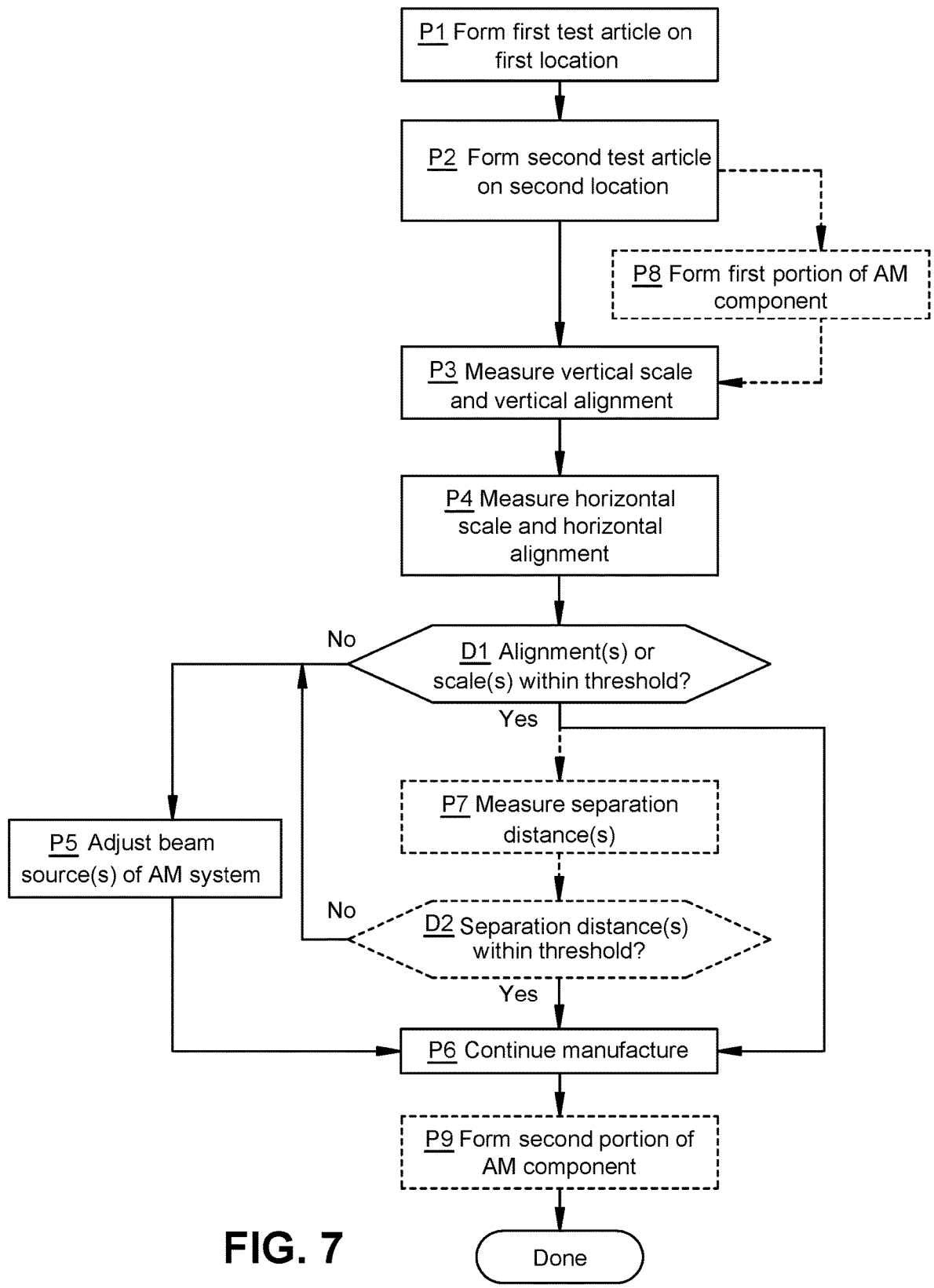
FIG. 7 shows an illustrative flow diagram of a method to align a melting beam source of an additive manufacturing (AM) system, according to embodiments of the disclosure.

FIG. 7 provides an illustrative flow diagram of methods for aligning beam source(s) 110, 112, 114, 116 in AM system 100. Referring to FIGS. 1, 4, 5, and 7 together, methods according to the disclosure are discussed in further detail. Process P1 in methods according to the disclosure may include forming test article 104 using AM system 100, in which first test article 104 may be on a first location of build plate 118 (e.g., within peripheral area 118b). First test article 104 may include any or all features of first test article 104 shown in FIGS. 2-5, as discussed herein. First test article 104, in a specific example, may include at least first surface 210 removably coupled to build plate 118. First test article 104 may also include second surface 210 including plurality of angled flat surface portions 220a, 220b, 220c, 220d, 220e, 220f, each having a distinct angle with respect to the horizontal plane as discussed herein. The angular differential between each adjacent flat surface portion 210a, 210b, 210c, 210d, 210e, 210f may be uniform (e.g., approximately ten degrees). Furthermore, first test article 104 may be non-symmetrical with respect to the horizontal plane but may have a predetermined vertical height $H_{TS}$ above build plate 118 e.g., due to the presence of elongated member 232. The height of first test article (s) 104 thus can be used to evaluate the vertical scaling and alignment of beam sources 110, 112, 114, 116 in further processing described here.

In process P2, embodiments of the disclosure may include forming a second test article 302 on another location of build plate 118 that is horizontally separated from first test article 104. As discussed elsewhere herein, second test article 302 may be on build plate 118, e.g., in peripheral area 118b thereof, and separated from first test article(s) 104 by a separation distance SD in plane X-Y. Second test article 302 may differ from first test article 104, e.g., by being symmetric with respect to the horizontal plane as discussed herein. Second test article(s) 302 thus can be used together with first test article(s) 104 within plane X-Y to evaluate the horizontal scaling and alignment of beam sources 110, 112, 114, 116 in further processing described herein.

Process P3 according to the disclosure includes measuring a vertical scale and vertical alignment of beam sources 110, 112, 114, 116 based on first test article 104. The term "vertical scale," as used herein, refers to the percentage difference between the height of first test article 104 above build plate 118 and a specified target height. For example, if first test article 104 has a height $H_{TS}$ of approximately 1.50 meters (m) but the target height of first test article 104 is only 1.0 m, then beam sources 110, 112, 114, 116 have a vertical scale of 150%. In further examples, the vertical scale may be expressed as a factor or dimensionless variable rather than as a percentage. The term "vertical alignment," as used herein, refers to the positional difference between a feature on first test article 104 and the target location for the feature. For instance, vertical alignment may be concerned with whether a physical feature (e.g., the boundary between body 200 and elongated member 232 of first test article 104) is at the correct height above build plate 118. The total distance (measured, e.g., in inn) between the target position and the actual position on first test article 104 thus may indicate the vertical alignment of beam sources 110, 112, 114, 116.

The measuring in process P3 may include, e.g., manual inspection and measurement of first test article 104, automatic analysis of first test article 104 via imaging devices such as cameras, laser-based measurement systems, and/or any other currently known or later developed system to measure the height of first test article 104 above build plate 118. Process P3 thus may include measuring vertical height $H_{TS}$ of first test article 104. As discussed elsewhere herein, vertical height $H_{TS}$ of first test article 104 may include height $H_{TM}$ of elongated member 232. First test article 104 may be at least as tall as height $H_C$ of AM component 102 that is formed on build plate 118, e.g., to allow measurement up to the same height that AM component 102 is built.

Process P4 according to the disclosure includes measuring a horizontal scale and horizontal alignment of beam sources 110, 112, 114, 116 based on first test article 104 and second test article 302. The term "horizontal scale," as used herein, refers to the percentage difference between the horizontal length or width of first test article 104 and/or second test article 302 as compared to the target dimension(s) for these components. For example, if first test article 104 has a horizontal width of approximately 0.20 μm but the target width of first test article 104 is 0.25 μm, then beam sources 110, 112, 114, 116 have a horizontal scale of 80%. In further examples, the horizontal scale may be expressed as a factor or dimensionless variable rather than as a percentage. The term "horizontal alignment," as used herein, refers to the positional difference between the target location(s) of first test article 104 and second test article 302 on build plate 118. For instance, horizontal alignment may be concerned with whether separation distance $S_D$ first test article 104 and second test article 302 is the correct amount, thereby indicating whether first test article 104 and second test article 302 are in their target positions on build plate 118. In a simplified example, separation distance $S_D$ (measured, e.g., in μm) between test articles 104, 302 may indicate the horizontal alignment of beam sources 110, 112, 114, 116.

The measuring in process P4 may include the same process(es) or similar process(es) to those implemented in process P3, but to measure physical parameters indicative of horizontal scale and horizontal alignment. Such processes may include, e.g., manual inspection and measurement of test articles 104, 302, automatic analysis of test articles 104, 302 via imaging devices such as cameras, laser-based measurement systems, and/or any other currently known or later developed system to measure the size and position of test articles 104, 302 on build plate 118. Process P3 thus may include measuring, e.g., the width(s) and length(s) of test articles 104, 302 and/or a separation distance $S_D$ between test articles 104, 302 along a particular axis. These and other measurements can indicate the size and position of various test articles 104, 302 on build plate 118 within plane X-Y.

In decision D1, embodiments of the disclosure determine whether any of the measured vertical scale, vertical alignment, horizontal scale, or horizontal alignment are within a corresponding threshold for the measured variable(s). A "target specification" may define the desired alignment(s) and scale(s) for AM system 100. In a simplified example, the determination may be based on whether the vertical scale is within a specified percentage (e.g., 5% above or below 100%) of a target specification, whether the vertical alignment is within a specified number of measurement units (e.g., 5 μm) of the target specification, whether the horizontal scale is within a specified percentage (e.g., 7% above or below 100%) of the target specification, or whether the horizontal alignment is within a specified number of measurement units (e.g., 7 μm) of the target specification. In further examples, decision D1 may be concerned with whether two or more of the measurements from processes P3, P4 are within a corresponding threshold, and/or whether all the measurements from processes P3, P4 are within corresponding thresholds for each measurement. When the alignment(s) or scale(s) are within the corresponding threshold(s) (i.e., "Yes" at decision D1), the method may continue to process P6 of continuing to manufacture components on build plate 118, e.g., additional AM component(s) 102 or subsequent portions of a partially-built AM component 102.

In various embodiments, decision D1 may include several determinations or sub-determinations implemented sequentially and/or simultaneously. Examples of such determinations are discussed by example herein to further illustrate possible implementations of the disclosure, and/or bases for determining, base on test article(s) 104, 302, whether to adjust any of beam sources 110, 112, 114, 116 in process P5. In one example, embodiments of the disclosure include forming first test article 104, e.g., including body 200 that is asymmetric within plane X-Y. Thus, process P3 may include measuring the total height HTS of first test article 104 and determination D1 may include determining whether total height HTS is not within a threshold of the target specification (e.g.,5% above or below the intended total height). Following the same example, total height HTS of first test article 104 may be outside the target range of the target specification, in which case controller 126 will also determine whether one or more physical features on first test article 104 (e.g., one or more of plurality of surfaces 220, 240, opening(s) 262) are located within a specified range (e.g., 2.0 μm) of its intended position on test article 104. In some cases, determination D1 may yield a "No" if either the vertical scale or vertical alignment are not within a threshold of the targeted specification as indicated by their respective measurements. In alternative implementations, determination D1 may yield a "No" only if the vertical scale and vertical alignment do not meet the target value(s) or range(s) set forth in the target specification.

In further examples, decision D1 may additionally or alternatively include further processes to determine whether the horizontal scale or horizontal alignment of test articles 104, 302 are not within a threshold of the target specification. This form of determination D1 may be implemented together with processes to determine whether the vertical scale and vertical alignment is/are within a threshold of the target specification, as discussed elsewhere herein. In some cases, determination D1 may include separate determinations relative to vertical attributes (e.g., vertical scale and alignment) and for horizontal attributes (e.g., horizontal scale and alignment). To determine whether the horizontal scaling is within a predetermined threshold of the target specification, the X-Y dimensions and/or surface area of test article(s) 104, 302 may be measured regardless of where each test article 104, 302 is located on build plate 118. Thus, determination D1 in some cases may be concerned solely with whether test article(s) 104, 302 are larger in length, width, and/or surface area within plane X-Y. In this case, the threshold may specify that the length, width, and/or surface area of one or more test articles 104, 302 cannot be greater than or less than, e.g., approximately seven percent of their target values. In addition or alternatively, determination D1 may be concerned with whether test article(s) 104, 302 are within a specified distance of their target positions in plane X-Y, and/or within a target distance of each other. Here, determination D1 may yield a "No" in cases where one or more test article(s) 104, 302 are more than, e.g., five μm away from their target position(s) as defined in the target specification. In a further example, the target specification may define a separation distance $S_D$ between one first test article 104 and an adjacent second test article 302. Separation distance $S_D$ being greater than or less than a specified percentage (e.g., three percent) of the target specification value may indicate that the horizontal alignment is not within the threshold. These forms of determining horizontal scale and horizontal alignment may be implemented together or separately. Thus, the method may proceed to process P5 in response to the horizontal scale not being within a threshold of the target specification, and/or in response to the horizontal alignment not being within a threshold of the target specification.

When the alignment(s) or scale(s) are not within the corresponding threshold(s) (i.e., "No" at decision D1), the method may proceed to process P5 of adjusting beam source(s) 110, 112, 114, 116 to achieve the target specification for AM system 100. The adjusting process in P5 may include, e.g., controller 126 adjusting a nominal target dimension in object code 124O such that beam sources(s) 110, 112, 114, 116 will subsequently operate in compliance with the specification. For example, if the previously determined vertical scale is 120%, process P5 may include altering object code 124O for an object such that its height increases, e.g., by five In this manner, controller 126 may account for measured discrepancies in scale or alignment by deliberately signaling beam source(s) 110, 112, 114, 116 to print a component with the incorrect dimensions, such that the AM component(s) 102 produced have dimensions that are within the target specification. In further implementations, controller 126, in process P5, may physically adjust a position or specified action of beam source(s) 110, 112, 114, 116, e.g., by changing a location, angular orientation, and/or range of movement in system code 124S to alter how beam source(s) 110, 112, 114, 116 produce AM component(s) 102 during operation of AM system 100.

Process P5 thus may include any conceivable operation to realign beam source(s) 110, 112, 114, 116, e.g., by changing attributes of object(s) defined in object code 124O, operations to be undertaken by beam source(s) 110, 112, 114, 116 in system code 124S, and/or actuation of beam source(s) 110, 112, 114, 116 to change their locations, orientations, movements, etc., within processing chamber 142. After process P5 concludes, the method may proceed to process P6 of continuing to manufacture AM component(s) 102, as discussed herein. The method then may conclude ("Done") or may be repeated, e.g., by forming test article(s) 104, 302 and/or continuing to measure vertical scale, vertical alignment, horizontal scale, and horizontal alignment of test article(s) 104, 302 on build plate 118.

Methods according to the disclosure may include any conceivable implementation of the example methodology discussed herein, and/or may include any number of additional or alternative processes to further analyze various features of component(s) 104, 302. In one example, further forms of analysis may be implemented in response to determining in decision D1, that alignments or scales under analysis are within the corresponding threshold(s). An additional process P7, may include measuring the separation distance(s) between test article(s) 104, 302, as discussed elsewhere herein, and/or further measuring the separation distance (e.g., distance $S_D$) between two or more of the same type of test article(s) 104, 302 on build plate 118. Hence, embodiments of the disclosure can further characterize the vertical scale, vertical alignment, horizontal scale, and/or horizontal alignment based on the distance between two or more test article(s) 104, 302. In this case, the measuring in process P7 may be relative to portions of build plate 118 that are located between test article(s) 104, 302 rather than measurable attributes of test article(s) 104, 302 themselves.

In cases where process P7 is implemented, decision D2 may include determining whether one or more of the measured separation distances are within a corresponding threshold for test component(s) 104, 302 under analysis. For example, the target specification may indicate that separation distance $S_D$ between one first test article 104 and its nearest second test article 302 should be, e.g., twenty μm, with the threshold being expressed as a tolerance of 0.5 μm more or less than twenty μm. If the separation distance measured in process P7 (e.g., separation distance $S_D$) is within the threshold (e.g., $S_D$ is greater than 19.5 μm and less than 20.5 μm), the methodology continues to process P6 for continuing the manufacture of AM component(s) 102 on build plate 118 (i.e., "Yes" at decision D2). If the separation distance measured in process P7 is not within the threshold (e.g., $S_D$ is less than 19.5 μm and greater than 20.5 μm), the methodology instead continues to process P5 for adjusting beam source(s) 110, 112, 114, 116 of AM system 100 (i.e., "No" at decision D2). It is understood that process P7 and decision D2 alternatively may be implemented before, concurrently with, and/or after the implementing of process P4 and decision D1.

Methods of the disclosure are capable of being implemented, e.g., partway through the manufacture of one AM component 102 and before all portions of AM component 102 have been completely formed. For instance, as shown in FIG. 4, AM component 102 may be subdivided into a first portion 102a that may be coupled to, and/or formed before, a second portion 102b that is located above first portion 102a. It is thus possible to implement methods according to the disclosure to align beam source(s) 110, 112, 114, 116 before AM component(s) 102 are completely formed, e.g., after first portion 102a is formed, but before second portion 102b is formed. In this case, the adjusting of beam source(s) 110, 112, 114, 116 can affect the forming of second portion 102b even if beam source(s) 110, 112, 114, 116 did not form first portion 102a with the desired scale(s), alignment(s), etc.

According to an example, methods according to the disclosure may include process P8 of forming first portion 102a of AM component 102 e.g., before, during, or after the forming of test articles 104, 302 on build plate 118. AM component 102 may be formed, e.g., using beam source(s) 110, 112, 114, 116 of AM system 100 as directed by code 124 of controller 126. Continued processing may include processes P3, P4, D1, P5, P6 (and/or optionally P7, D2) as discussed herein. However, such operations need not be implemented on AM component 102 and may be performed only regarding first test article 104 and second test article 302. Although first test article 104 and second test article 302 may be formed independently from AM component 102, they nonetheless are formed by beam source(s) 110, 112, 114, 116 in the same alignment, position, etc., and thus indicate the how AM component 102 is built. If process P5 subsequently adjusts beam source(s) 110, 112, 114, 116, as discussed herein, embodiments of the disclosure may include, e.g., as part of process P6 or after process P6, process P9 of forming second portion 102b of AM component 102. Embodiments of the disclosure thus are operable to adjust beam source(s) 110, 112, 114, 116 in AM system 100 even before AM component 102 is completely built. In still further implementations, methods according to the disclosure may be implemented several times as AM component(s) 102 are built, in which case AM component(s) 102 may be subdivided into more than two (e.g., three, five, ten, or more) portions for further adjusting of beam source(s) 110, 112, 114, 116.

Embodiments of the disclosure may provide several technical and commercial advantages, and examples of such advantages are discussed herein. Embodiments of the disclosure allow the forming of first test article(s) 104 and second test article(s) 302 to be integrated into process(es) to form any conceivable type or shape of AM component(s) 102, e.g., by forming test article(s) 104, 302 in peripheral area 118b of build plate 118. Embodiments of the disclosure thereby provide an expeditious, automated, and uniform check of individual beam source 110, 112, 114, 116 scaling and/or alignment for every unit of AM system 100 without the need to develop a unique on-plate inspection for each AM component 102 being manufactured. Embodiments of the disclosure, when implemented over a longer period, enable print-to-print monitoring for each AM system 100 to check beam source 110, 112, 114, 116 scaling, automatic beam source 110, 112, 114, 116 calibration, and general upkeep, with negligible additional build time and/or material consumption.

It should be noted that in some alternative implementations, the acts described may occur out of the order noted or, for example, may in fact be executed substantially concurrently or in the reverse order, depending upon the act involved. Also, one of ordinary skill in the art will recognize that additional processes may be added.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described to best explain the principles of the disclosure and the practical application, and to enable others of ordinary skill in the art to understand the disclosure for various embodiments with various modifications as are suited to the particular use contemplated.

What is claimed is:

1. A method for aligning a melting beam source in an additive manufacturing (AM) system, the method comprising:
    forming a first test article with the AM system on a first location of a build plate, the first test article having a first shape including:
        a body having a forward face and a rearward face opposite the forward face,
        a first surface extending between the forward face and the rearward face of the body, and including a plurality of protrusions for removable coupling of the body to a build plate, the plurality of protrusions including supports of additively manufacturable material with arcuate openings between the supports of additively manufacturable material coupling the body to the build plate, and
        a second surface on the body extending between the forward face and the rearward face of the body, the second surface including a plurality of angled flat surface portions, each of the plurality of angled flat surface portions having a distinct angle with respect to one of the forward face of the body and the rearward face of the body, wherein an angular difference between each adjacent angled flat surface portion in the plurality of angled flat surface portions is substantially uniform;
    forming a second test article with the AM system on a second location of the build plate, the second test article having a second shape different from the first shape;
    measuring a vertical scale and a vertical alignment of the melting beam source based on the first test article;
    measuring a horizontal scale and a horizontal alignment of the melting beam source based on the second test article;
    determining whether at least one of the vertical scale, the vertical alignment, the horizontal scale, or the horizontal alignment of the melting beam source is not within a corresponding tolerance of a target specification;
    in response to the at least one of the vertical scale, the vertical alignment, the horizontal scale, or the horizontal alignment not being within the corresponding tolerance, adjusting the melting beam source of the AM system to align the melting beam source to yield the target specification; and
    forming an AM component on the build plate.

2. The method of claim 1, further comprising:
    forming a first portion of the AM component before adjusting the melting beam source of the AM system; and
    forming a second portion of the AM component after adjusting the melting beam source of the AM system.

3. The method of claim 1, wherein the second test article includes:
    a plurality of supports on the build plate; and
    a cylindrical body on the plurality of supports.

4. The method of claim 1, wherein the first shape is non-symmetrical with respect to a horizontal plane, and wherein the second shape is symmetrical with respect to the horizontal plane.

5. The method of claim 1, further comprising:
measuring a separation distance between the first test article and the second test article on build plate;
determining whether the separation distance is within a separation tolerance; and
adjusting the melting beam source of the AM system to align the melting beam source to yield the target specification in response to determining the separation distance not being within the separation tolerance.

6. The method of claim 1, wherein the first test article includes a third surface extending between the forward face and the rearward face of the body, and including a plurality of protrusions for removable coupling of the body to an elongated member.

7. The method of claim 1, wherein the first location and the second location are each within a peripheral area of the build plate, and the AM component is within a non-peripheral area of the build plate.

8. A program product stored on a non-transitory computer readable storage medium for aligning a melting beam source in an additive manufacturing (AM) system, the non-transitory computer readable storage medium comprising program code for causing a computer system to perform actions including:
causing the AM system to form a first test article on a first location of a build plate, the first test article having a first shape including:
a body having a forward face and a rearward face opposite the forward face,
a first surface extending between the forward face and the rearward face of the body, and including a plurality of protrusions for removable coupling of the body to a build plate, the plurality of protrusions including supports of additively manufacturable material with arcuate openings between the supports of additively manufacturable material coupling the body to the build plate, and
a second surface on the body extending between the forward face and the rearward face of the body, the second surface including a plurality of angled flat surface portions, each of the plurality of angled flat surface portions having a distinct angle with respect to one of the forward face of the body and the rearward face of the body, wherein an angular difference between each adjacent angled flat surface portion in the plurality of angled flat surface portions is substantially uniform;
causing the AM system to form a second test article on a second location of the build plate, the second test article having a second shape different from the first shape;
measuring a vertical scale and a vertical alignment of the melting beam source based on the first test article;
measuring a horizontal scale and a horizontal alignment of the melting beam source based on the second test article;
determining whether at least one of the vertical scale, the vertical alignment, the horizontal scale, or the horizontal alignment of the melting beam source is not within a corresponding tolerance of a target specification;
in response to the at least one of the vertical scale, the vertical alignment, the horizontal scale, or the horizontal alignment not being within the corresponding tolerance, adjusting the melting beam source of the AM system to align the melting beam source to yield the target specification; and
forming an AM component on the build plate.

9. The program product of claim 8, further comprising program code for:
causing the AM system to form a first portion of the AM component before adjusting the melting beam source of the AM system; and
causing the AM system to form a second portion of the AM component after adjusting the melting beam source of the AM system.

10. The program product of claim 8, wherein the second test article includes:
a plurality of supports on the build plate; and
a cylindrical body on the plurality of supports.

11. The program product of claim 8, wherein the first shape is non-symmetrical with respect to a horizontal plane, and wherein the second shape is symmetrical with respect to the horizontal plane.

12. The program product of claim 8, further comprising program code for:
measuring a separation distance between the first test article and the second test article on build plate;
determining whether the separation distance is within a separation tolerance; and
adjusting the melting beam source of the AM system to align the melting beam source to yield the target specification in response to determining the separation distance not being within the separation tolerance.

13. The program product of claim 8, wherein the first test article includes a curvilinear channel on at least one of the forward face or the rearward face of the body.

14. The program product of claim 8, wherein the first location and the second location are each within a peripheral area of the build plate, and the AM component is within a non-peripheral area of the build plate.

15. A system comprising:
an additive manufacturing (AM) system having a melting beam source for building a component on a build plate; and
a controller in communication with the melting beam source of the AM system, the controller being operable to:
cause the AM system to form a first test article on a first location of a build plate, the first test article having a first shape including:
a body having a forward face and a rearward face opposite the forward face,
a first surface extending between the forward face and the rearward face of the body, and including a plurality of protrusions for removable coupling of the body to a build plate, the plurality of protrusions including supports of additively manufacturable material with arcuate openings between the supports of additively manufacturable material coupling the body to the build plate, and
a second surface on the body extending between the forward face and the rearward face of the body, the second surface including a plurality of angled flat surface portions, each of the plurality of angled flat surface portions having a distinct angle with respect to one of the forward face of the body and the rearward face of the body, wherein an angular difference between each adjacent angled flat surface portion in the plurality of angled flat surface portions is substantially uniform;

cause the AM system to form a second test article on a second location of the build plate, the second test article having a second shape different from the first shape;

measure a vertical scale and a vertical alignment of the melting beam source based on the first test article;

measure a horizontal scale and a horizontal alignment of the melting beam source based on the second test article;

determine whether at least one of the vertical scale, the vertical alignment, the horizontal scale, or the horizontal alignment of the melting beam source is not within a corresponding tolerance of a target specification;

in response to the at least one of the vertical scale, the vertical alignment, the horizontal scale, or the horizontal alignment not being within the corresponding tolerance, adjust the melting beam source of the AM system to align the melting beam source to yield the target specification; and forming an AM component on the build plate.

16. The system of claim 15, wherein the second test article includes:
a plurality of supports on the build plate; and
a cylindrical body on the plurality of supports.

17. The system of claim 15, wherein the first shape is non-symmetrical with respect to a horizontal plane, and wherein the second shape is symmetrical with respect to the horizontal plane.

18. The system of claim 15, further comprising program code for:
measuring a separation distance between the first test article and the second test article on build plate;
determining whether the separation distance is within a separation tolerance; and
adjusting the melting beam source of the AM system to align the melting beam source to yield the target specification in response to determining the separation distance not being within the separation tolerance.

19. The system of claim 15, wherein the first test article includes a third surface extending between the forward face and the rearward face of the body, and including a plurality of protrusions for removable coupling of the body to an elongated member.

20. The system of claim 15, wherein the first location and the second location are each within a peripheral area of the build plate, and the AM component is within a non-peripheral area of the build plate.

* * * * *